US006200515B1

(12) United States Patent
Munir et al.

(10) Patent No.: US 6,200,515 B1
(45) Date of Patent: Mar. 13, 2001

(54) ONE-STEP SYNTHESIS AND CONSOLIDATION OF NANOPHASE MATERIALS

(75) Inventors: Zuhair A. Munir, Davis, CA (US); Frederic Charlot, Dijon (FR); Frederic Bernard, Neuilly-les-Dijon (FR); Eric Gaffet, Evette Salbert (FR)

(73) Assignees: Centre National de la Recherche Scientifique, Paris (FR); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/374,049

(22) Filed: Aug. 13, 1999

(51) Int. Cl.[7] .................................. B22F 3/14; H05B 6/00
(52) U.S. Cl. ........................... 264/434; 264/449; 419/45; 419/48; 419/51; 419/52
(58) Field of Search ................................ 264/430, 434, 264/449; 419/45, 48, 51, 52

(56) References Cited

U.S. PATENT DOCUMENTS 5,380,409   1/1995   Munir et al. ........................ 205/340
5,794,113   8/1998   Munir et al. ........................ 419/45

OTHER PUBLICATIONS

Abdellaoui and Gaffet, *Acta. Mater.* (1996) 44(2): 725–734.

Charlot et al., *Acta. Mater.* (1999) 47(2): 619–629.

Munir, *Journal of Materials synthesis and Processing* (1993) 1(6): 387–394.

*Primary Examiner*—Mary Lynn Theisen
(74) *Attorney, Agent, or Firm*—Townsend and Townsend and Crew LLP

(57) ABSTRACT

Solid reaction products with a dense nanocrystalline structure are formed from reactant particles with diameters in the nano-scale range by compacting the particles into a green body, then passing an electric current through the body causing Joule heating sufficient to initiate the reaction to form the reaction product while simultaneously applying pressure to the reacting body to density it to a density approaching the theoretical density of the pure product. Surprisingly, this process results in a reaction product that retains the nanocrystalline structure of the starting materials, despite the fact that a reaction has occurred and the materials have been subjected to highly stringent conditions of electric current, heat and pressure.

9 Claims, 3 Drawing Sheets

ONE-STEP SYNTHESIS AND CONSOLIDATION OF NANOPHASE MATERIALS

GOVERNMENT RIGHTS

This invention was made with Government support under Contract No. DAAH04-95-0353, awarded by the Army Research Office. The Government has certain rights in this invention.

This invention relates to materials science, and particularly to the preparation of solid crystalline ceramic, intermetallic, and composite materials with grain sizes in the nanometer range.

BACKGROUND OF THE INVENTION

Synthesized solid materials such as ceramics, composites and intermetallic materials in which the grain size is in the nanometer ($10^{-9}$ m) range are the subject of active development due to their unique properties. For example, nanometer-scale crystals have the potential of improving the processing and performance characteristics of ceramics, composite polymers, catalysts, filtration systems, and transmission media.

Products and materials with nanometer-scale crystallites are formed from nanometer-scale particles in processes that entail first forming the particles of the desired chemistry and size scale, combining the particles into a green body, and then densifying the particles. Traditional metallurgical techniques such as casting, hot rolling and powder metallurgy have been used in combining the particles, and a reactive process known as combustion synthesis, reactive sintering, or self-propagating high-temperature synthesis has been used in some cases.

A group of processes that have not heretofore been used with nanoparticles but otherwise form the background of this invention are field-assisted combustion synthesis and field-activated pressure-assisted synthesis. A description of field-assisted combustion synthesis is found in U.S. Pat. No. 5,380,409, issued Jan. 10, 1995, to Munir et al, and a description of field-activated pressure-assisted synthesis is found in U.S. Pat. No. 5,794,113, issued Aug. 11, 1998, to Munir et al. The entire contents of both of these patents are incorporated herein by reference. In field-assisted combustion synthesis, a precursor material consisting of the starting materials that will react or combine to form a desired product is exposed to an electric field that energizes the material by propagating a current through the material that energizes the material but is not high enough to ignite the reaction. The reaction is then ignited in a subsequent step by radiative energy while the energizing wave sustains the propagation of the reaction through the material. Field-activated pressure-assisted synthesis, by contrast is the simultaneous application of a high current and pressure to effect both the synthesis reaction and densification of the product. Unlike field-assisted combustion synthesis, the current used is high enough to cause Joule heating of the material to the ignition temperature.

The utility and success of both field-assisted combustion synthesis and field-activated pressure-assisted synthesis have only been demonstrated with particles in the micron ($10^{-6}$ m) size range. Accordingly, neither process carries an expectation that it can be applied to nano-scale particles to result in a product that will successfully retain the nanocrystalline structure of the starting particles. Due to the delicate nature of the nano-scale particles and the extreme conditions imposed during these two processes, the risk that the nano-phase will be lost or substantially reduced is great enough to prevent one from predicting that a nanocrystalline product will be formed.

SUMMARY OF THE INVENTION

It has now been discovered that field-activated pressure-assisted synthesis can be performed on nano-scale particles of reactant materials to achieve a dense reaction product that substantially retains the nanocrystalline structure of the starting materials. Accordingly, solid particulate reactants in accordance with this invention are milled to particle sizes in the nanometer range (a step referred to herein as "mechanical milling"), then compacted into a green body in a stoichiometric ratio corresponding to that of the desired product, and the green body is then simultaneously exposed to an electric current (AC or pulsed DC) sufficient to cause Joule heating of the body to a temperature at which initiation of the reaction occurs and to a pressure sufficiently high to density the product. The reaction is completed within a very short period of time and the product is consolidated to a high density as the reaction is occurring. Grain growth and hence the loss of the nanocrytalline structure, which would normally be expected to occur subsequent to product formation, are either minimized or avoided entirely.

Further objects, features, and advantages of the invention will become apparent from the description that follows.

DETAILED DESCRIPTION OF THE INVENTION AND PREFERRED EMBODIMENTS

Figure 1:
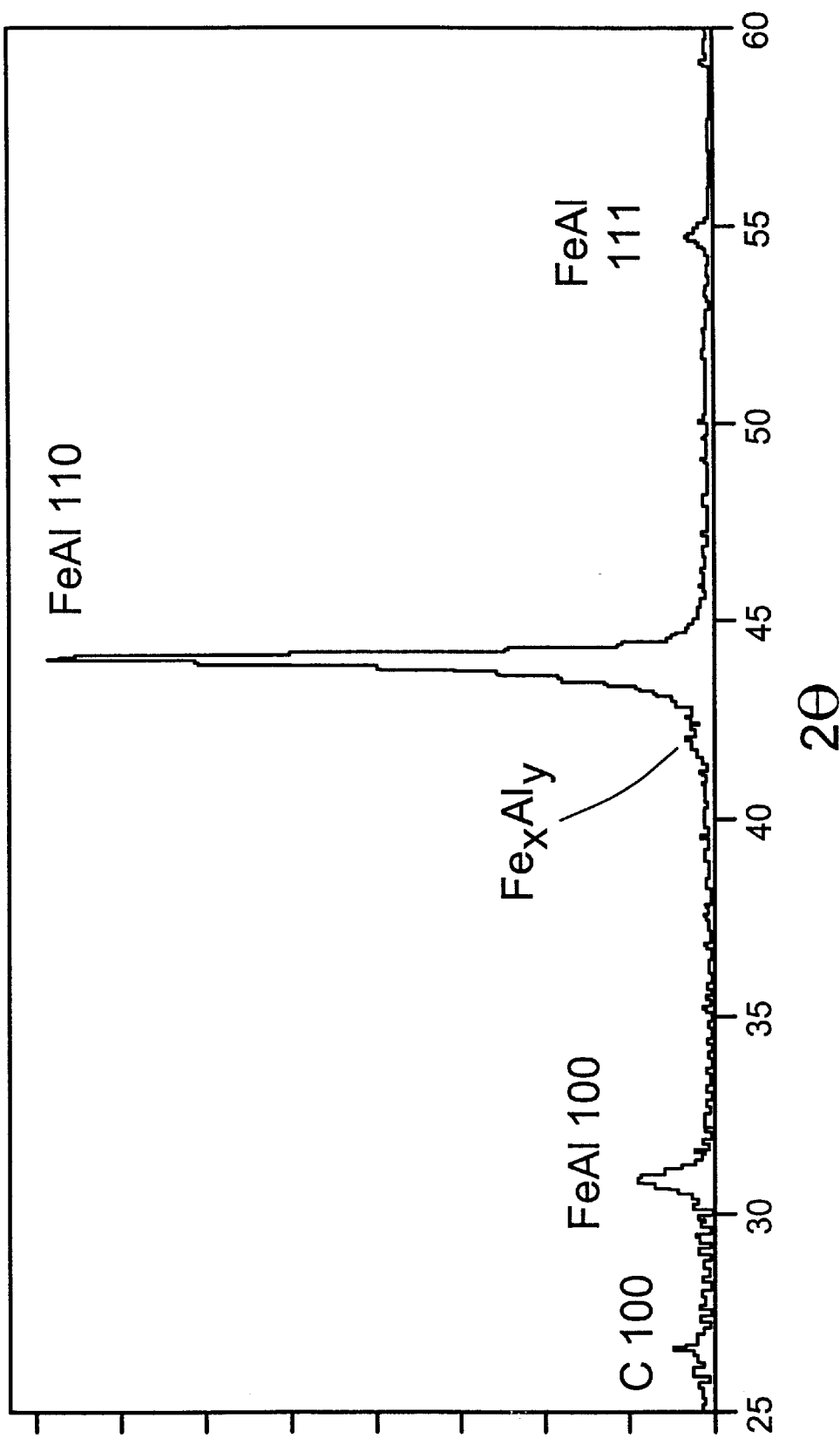
FIG. 1 is an x-ray diffraction pattern of an FeAl product prepared according to the process of this invention.

This invention is applicable to the preparation of ceramics, composites, and intermetallic materials. Ceramics include carbides, silicides, and borides, such as silicon carbide, boron carbide, tungsten carbide, tungsten boride, tungsten silicide, molybdenum boride, tantalum silicide, aluminum carbide, niobium silicide, molybdenum silicide and others. Examples of composites are silicon carbide/molybdenum silicide composites, alumina/silicon carbide composites, and titanium carbide cermets. Examples of intermetallic materials are aluminides of nickel, cobalt, copper, iron, molybdenum, niobium titanium, and zirconium, and alloys of titanium with nickel, cobalt and iron.

The terms "nanoscale," "nanophase," and the like as used herein refer to particles whose linear dimensions (roughly, their diameters) are substantially less than 1 micrometer. Preferred particles for use in this invention are those whose diameters are less than about 200 nm, more preferred are those whose diameters are within the range of from about 10 nm to about 200 nm, and the most preferred are those whose diameters are within the range of from about 20 nm to about 100 nm. Achieving reactant particles within these size ranges, ie., mechanically milled particles, is accomplished by methods known in the art. The starting form of these materials may be ribbons, particles of a size scale larger than nanometer scale (such as micron-sized particles), or any other physical form or shape of the materials. A preferred method of reducing the materials to the nanometer size range is by subjecting the materials, most preferably in the form of micron-sized particles, to milling in high-impact mills such as planetary ball mills or horizontal rod mills. Mills of these types are known among those skilled in the art of nanomaterials, and are described in the published literature, for example, in Abdellaoui, M., et al., *Acta Mater.* 44(2): 725–734 (1996), and in Charlot, F., et al., *Acta Mater.* 47(20: 619–629 (1999).

The nanoscale particles are compacted or compressed to form a green body, which is a body having the general shape of the final product but slightly larger in dimensions and hence with less than full density. The relative density of the green body, i.e., its actual density divided by the theoretical density of the pure nonporous product, expressed as a percent, is not critical and may vary with the materials, the manner in which the thermal conductivity of the materials mixture varies with the density, and the nature and desired properties of the finished product. In most cases, the relative density of the green body will range from about 30% to about 90%, and typically from about 55% to about 75%.

Once the green body is formed, it is preferably placed in an atmosphere of inert gas, by alternately evacuating the body and infusing it with the gas in one or a series of cycles. Any gas can be used that will not interfere or compete with the reaction that will occur during application of the electric current. Conventional inert gases such as nitrogen and argon are examples. This process can also be done under vacuum.

Once the green body is ready for reaction, an electric current is applied at a level high enough to cause Joule heating of the body to the ignition temperature. The term "ignition temperature" is used herein to denote the temperature at which a reaction is initiated between the starting materials to convert them to the product. The ignition temperature $T_i$, attained by Joule beating can be predicted from the following relation:

$$T_i = T_0 + \frac{V^2}{C_p Rm} \cdot \tau$$

where $T_0$ is the ambient temperature, V is the applied voltage across the green body, $C_p$ is the heat capacity of the green body, R is the resistance of the green body, m is the mass of the green body, and $\tau$ is the duration of the application of the voltage. The appropriate or optimum current for any particular procedure will thus vary with the choice of starting materials and the reaction that they will undergo, and the size and density of the green body. In most cases, appropriate currents will be within the range of from about 1,000 Å to about 2,500 Å, and preferably from about 1,200 Å to about 1,800 Å, but in all cases the magnitude of the optimal current is material dependent. The current may be alternating current or direct current, pulsed or continuous.

While the current is applied, the green body is placed under a pressure high enough to achieve a substantial increase in the relative density to achieve a reaction product of the desired high density. The increase in density is generally by an increment of at least about 15 percentage units, preferably at least about 20 percentage units. Stated otherwise, the increase in density is preferably such that the reaction product will have a relative density of at least about 90%, and more preferably at least about 95%, and most preferably greater than 95%. Preferred pressures are those in the range of from about 30 MPa to about 300 MPa (4,350 psi to 43,500 psi), more preferably from about 50 MPa to about 200 MPa (7,250 psi to 29,000 psi), and most preferably from about 70 MPa to about 110 Mpa (10,200 psi to 160,000 psi). Again, the optimum pressure will vary with the particular material being synthesized. Conventional apparatus can be used for applying the current and pressure simultaneously, as disclosed in U.S. Pat. No. 5,794,113, referenced above. In simplified terms, the apparatus in that patent consists of a graphite die to contain the green body, and a graphite block and graphite punch extending into the die to apply pressure.

The following examples are offered for purposes of illustration, and not intended to limit or to define the scope of the invention.

EXAMPLES

Mixtures of elemental particles of iron (10 μm) and aluminum (40 μm) or molybdenum (15 μm) and silicon (10–15 μm) were separately co-milled in a planetary ball mill in which the particles were placed in a 45-mL stainless steel vial with five stainless steel balls (15 mm in diameter and 14 g in weight) at a ball to powder weight ratio of 7/1 under an inert atmosphere. The relative amounts of metal in the iron-aluminum mixture was 53% Fe and 47% Al by weight (equal to a stoichiometric ratio corresponding to the formula FeAl), and 33% Mo and 66% Si by weight (equal to a stoichiometric ratio corresponding to the formula $MoSi_2$). For the Fe/Al mixture, the disk rotation speed was 150 rpm, the vial rotation speed was 200 rpm, and milling continued for 4 hours. For the Mo/Si mixture, disk rotation speeds of 350 and 250 rpm were used, with a vial rotation speed of 250 rpm, and milling times were 1, 2, and 3 hours at the disk rotation speed of 350 rpm, and 3, 4, and 6 hours at the disk rotation speed of 250 rpm. Final particle sizes were determined by x-ray diffraction studies on a Siemens D5000 diffractometer, using a monochromatic $CuK_\alpha$ beam and an $SiO_2$ standard. Using conventional interpretive methods, the analysis showed that the molybdenum and silicon particles (after milling at 350 rpm disk rotation for 3 hours) had crystalline sizes of 54 nm and 34 nm, respectively, and the iron and aluminum particles had crystalline sizes of 70 nm and 90 nm, respectively.

After milling, the mixed Fe/Al and Mo/Si powders (10 g) were separately placed in a graphite die of the type disclosed in U.S. Pat. No. 5,794,113 (outside diameter, 45 mm; inside diameter, 20 mm, height, 40 mm). The die chamber was evacuated with three cycles of vacuum (150 mtorr) separated by infusions of argon gas. The chamber was them evacuated, and pressure was applied by a uniaxial hydraulic press, from 0 to 320 MPa at a rate of about 10 MPa/s. Pulsed DC or AC current was then applied at specified levels for specified periods of time (as indicated in the tables below), and the temperature was detected by either a single-spot, two-color pyrometer (IRCON Modline-R-99C15) through a small window or (where denoted in the tables below by an asterisk) a K-type thermocouple in contact with the die. Densification was determined from geometrical measurements and by the Archimedes method. Relative densities were determined by comparison with known densities of the pure compounds—the (theoretical) density of pure FeAl is 5.66 g/cm$^3$, and the (theoretical) density of pure $MoSi_2$ is 6.27 g/cm$^3$.

The results in terms of density measurements for FeAl are listed in Table I, in which particles that were milled by the planetary ball mill are so indicated and those that were not milled by the planetary ball mill are indicated as processed only by a common (turbula) mill. The last column (densification) is defined as:

$$\frac{\rho_{after} - \rho_{before}}{\rho_{theoretical} - \rho_{before}} \times 100\%$$

TABLE I

FeAl Formation: Conditions and Density Results

| | | Particle | Treatment Conditions | | | | Relative Densities | | |
|---|---|---|---|---|---|---|---|---|---|
| No. | Pretreatment Particle Processing | Size Range (nm) | Current (A) | Pressure (MPa) | Time (min, sec) | Temp. max. (° C.) | Before | After | Densification (%) |
| 1 | ball mill | 250–1400 | 1000 | 70 | 4'0" | | | 83.04 | |
| 2 | ball mill | 250–1400 | 1500 | 70 | 2'30" | 1000 | | 90.81 | |
| 3 | ball mill | <250 | 1500 | 70 | 2'30" | 1050 | | 95.05 | |
| 4 | ball mill | <250 | 1500 | 70 | 5'0" | 1104 | 71.00 | 98.59 | 96.4 |
| 5 | turbula | <250 | 1500 | 70 | 3'0" | 1000 | 75.00 | 95.47 | 90.2 |
| 6 | ball mill | <250 | 1000 | 70 | 5'0" | | 69.00 | 98.52 | 72.0 |
| 7 | ball mill | <250 | 1500 | 70 | 3'30" | 1107 | | 83.04 | 83.0 |
| 8 | ball mill | <250 | 1500 | 106 | 2'30" | 1075 | 70.00 | 94.41 | 96.0 |
| 9 | ball mill | <250 | 1250 | 106 | 3'3" | 950 | 68.00 | 98.76 | 97.0 |
| 10 | turbula | <250 | 1500 | 106 | 2'30" | 950 | 71.00 | 101.06 | 102.7 |
| 11 | ball mill | <250 | 1500 | 106 | 2'30" | 1030 | 70.50 | 98.94 | 97.3 |
| 12 | ball mill | <250 | 1250 | 70 | 3'35" | 942 | 67.70 | 96.82 | 92.4 |
| 13 | ball mill | <1400 | 1500 | 70 | 2'30" | 1040 | 71.50 | 99.29 | 98.2 |
| 14 | ball mill | >250 | 1500 | 70 | 2'30" | 986* | 70.12 | 95.94 | 69.9 |
| 15 | ball mill | >250 | 1250 | 70 | 5'0" | 613* | 69.59 | 93.64 | 84.3 |
| 16 | turbula | <50 | 1500 | 70 | 2'30" | 897* | 60.15 | 98.34 | 96.6 |
| 17 | turbula | <50 | 1500 | 70 | 2'50" | 943* | 73.46 | 98.48 | 95.9 |

Density measurements for $MoSi_2$ are listed in Table II, where the mechanical milling conditions are listed as disk rotation speed (rpm)/vial rotation speed (rpm)/duration (hours).

TABLE II

$MoSi_2$ Formation: Conditions and Density Results

| | | Treatment Conditions | | | | Relative Densities | | |
|---|---|---|---|---|---|---|---|---|
| No. | Mechanical Activation Conditions | Current (A) | Pressure (MPa) | Time (min, sec) | Temp. max. (° C.) | Before (%) | After (%) | Densification (%) |
| 1 | 350/250/3 | 1600 | 106 | 3'0" | 1200 | 63.85 | | |
| 2 | 350/250/1 | 1600 | 106 | 5'30" | 1003 | 59.54 | 92.90 | 86.9 |
| 3 | 350/250/2 | 1600 | 106 | 4'30" | 1025 | 61.36 | 93.16 | 87.0 |
| 4 | 250/250/3 | 1600 | 106 | 4'20" | 1145 | 57.95 | 82.16 | 67.7 |
| 5 | 250/250/4 | 1600 | 106 | 3'30" | 1151 | 84.78 | 82.83 | 50.3 |
| 6 | 250/250/6 | 1600 | 106 | 4'30" | 1164 | 63.67 | 86.78 | 74.0 |

Phase determinations for the FeAl products listed in Table I were performed on a SCINTAG XDS 2000 x-ray diffractometer with a Cu cathode, at the wavelength of $K_\alpha$ and a continuous scan of 3 deg/min. This avoided detection of the graphite layer on the samples. The results are shown in Table III, where the asterisk in the Major Phase column denotes the presence of graphite contamination on the sample surface, the "A" notation in the Minor Phase column denotes an undetermined phase, and the "B" notation in the Minor Phase column denotes the presence of iron oxide on the sample surface after the sample was polished in the presence of water.

TABLE III

FeAl Formation: Conditions and Phase Results

| | | Treatment Conditions | | | | Phases | |
|---|---|---|---|---|---|---|---|
| No. | Pretreatmemt Particle Processing | Current (A) | Pressure (MPa) | Time (min, sec) | Temp. max. (° C.) | Major | Minor |
| 1 | ball mill | 1000 | 70 | 4'0" | | FeAl | $FeAl_2$(<5%) |
| 2 | ball mill | 1500 | 70 | 2'30" | 1000 | FeAl | $FeAl_2$(<5%) |
| 3 | ball mill | 1500 | 70 | 2'30" | 1050 | FeAl | $FeAl_2$(<5%) |
| 4 | ball mill | 1500 | 70 | 5'0" | 1104 | FeAl* | "B" |
| 5 | turbula | 1500 | 70 | 3'0" | 1000 | FeAl* | "A" |

TABLE III-continued

FeAl Formation: Conditions and Phase Results

| | | Treatment Conditions | | | | | |
|---|---|---|---|---|---|---|---|
| | Pretreatmemt Particle | Current | Pressure | Time (min, sec) | Temp. max. | Phases | |
| No. | Processing | (A) | (MPa) | | (° C.) | Major | Minor |
| 6 | ball mill | 1000 | 70 | 5'0" | | | |
| 7 | ball mill | 1500 | 70 | 5'30" | 1107 | FeAl* | AlFe$_3$CO$_{0.5}$, "A" |
| 8 | ball mill | 1500 | 106 | 2'30" | 1075 | FeAl* | |
| 9 | ball mill | 1250 | 106 | 3'3" | 950 | FeAl* | |
| 10 | turbula | 1500 | 106 | 2'30" | 950 | FeAl* | |
| 11 | ball mill | 1500 | 106 | 2'30" | 1030 | FeAl* | |
| 12 | ball mill | 1250 | 70 | 3'35" | 942 | FeAl* | |
| 13 | ball mill | 1500 | 70 | 2'30" | 1040 | FeAl* | "A" |
| 14 | ball mill | 1500 | 70 | 2'30" | 986* | FeAl* | FeAl$_2$, "A", "B" |
| 15 | ball mill | 1250 | 70 | 5'0" | 613* | FeAl* | FeAl$_2$(<5%) |
| 16 | turbula | 1500 | 70 | 2'30" | 897* | FeAl* | FeAl$_2$(<5%) |
| 17 | turbula | 1500 | 70 | 2'50" | 943* | | |

The product listed in this table as No. 12 was analyzed by x-ray diffraction, and the resulting pattern is shown in FIG. 1. The pattern indicates a substantially single-phase product The products listed as Nos. 3 (mechanically activated by ball milling) and 16 (not mechanically activated) were cut by a diamond wheel and x-ray diffraction studies were performed on the cut faces as well as the external faces of each. Two diffractomers were used, a D5000 Siemens diffractometer for the cut face and an INEL diffractometer for the external face. The specifications of each and the results obtained are listed in Table IV.

Phase determination for the MoSi$_2$ products listed in Table II were performed in the same manner as those described above for FeAl. The results are listed in Table V. (The major phases in each case contained graphite contamination on the sample surface.)

TABLE IV

X-Ray Diffraction Studies on FeAl Samples

| Diffractometer and conditions | Product No. 3 (mechanically activated) | Product No. 16 (not mechanically activated) |
|---|---|---|
| D5000 Siemens theta/2 theta Cu Kβ (monochromatic) step-by-step step size 0.02 deg 2 theta step time 100s | internal side: no equiax crystallite assymmetric peak not resolved, but [100] direction crystallite size = 15 nm [110] direction crystallite size = 35 nm | external side: asymmetric resolved by 2 symmetric peaks: [a = 2.9146 ang], crystallite size = 20 nm [a = 9.066 and], crystallite size = 100 nm |
| CPS INEL detector CPS (120 degree theta at each time) Co Kα continuous scan 4096 channels to 120 2 theta 2h | internal side: asymmetric resolved by 2 symmetric peaks: [a = 2.9317 ang], crystallite size = 13 nm [a = 2.9045 ang], crystallite size = 18 nm | external side: asymmetric resolved by 2 symmetric peaks: [a = 2.9224 ang], crystallite size = 17 nm [a = 2.9055 ang], crystallite size = 90 nm |

TABLE V

MoSi$_2$ Formation: Conditions and Phase Results

| No. | Mechanical Activation Conditions | Treatment Conditions | | | | Phases | |
| --- | --- | --- | --- | --- | --- | --- | --- |
| | | Current (A) | Pressure (MPa) | Time (min, sec) | Temp. max. (° C.) | Major | Minor |
| 1 | 350/250/3 | 1600 | 106 | 3'0" | 1200 | MoSi$_2$ | |
| 2 | 350/250/1 | 1600 | 106 | 5'30" | 1003 | MoSi$_2$ | |
| 3 | 350/250/2 | 1600 | 106 | 4'30" | 1025 | MoSi$_2$ | |
| 4 | 250/250/3 | 1600 | 106 | 4'20" | 1145 | MoSi$_2$ | Mo$_5$Si$_3$(20%), Si(10%), Mo$_3$Si$_7$ |
| 5 | 250/250/4 | 1600 | 106 | 3'30" | 1151 | MoSi$_2$ | Mo$_5$Si$_3$(12%), Si(9%) |
| 6 | 250/250/6 | 1600 | 106 | 4'30" | 1164 | MoSi$_2$ | trace Mo$_5$Si$_3$ |

Figure 2:
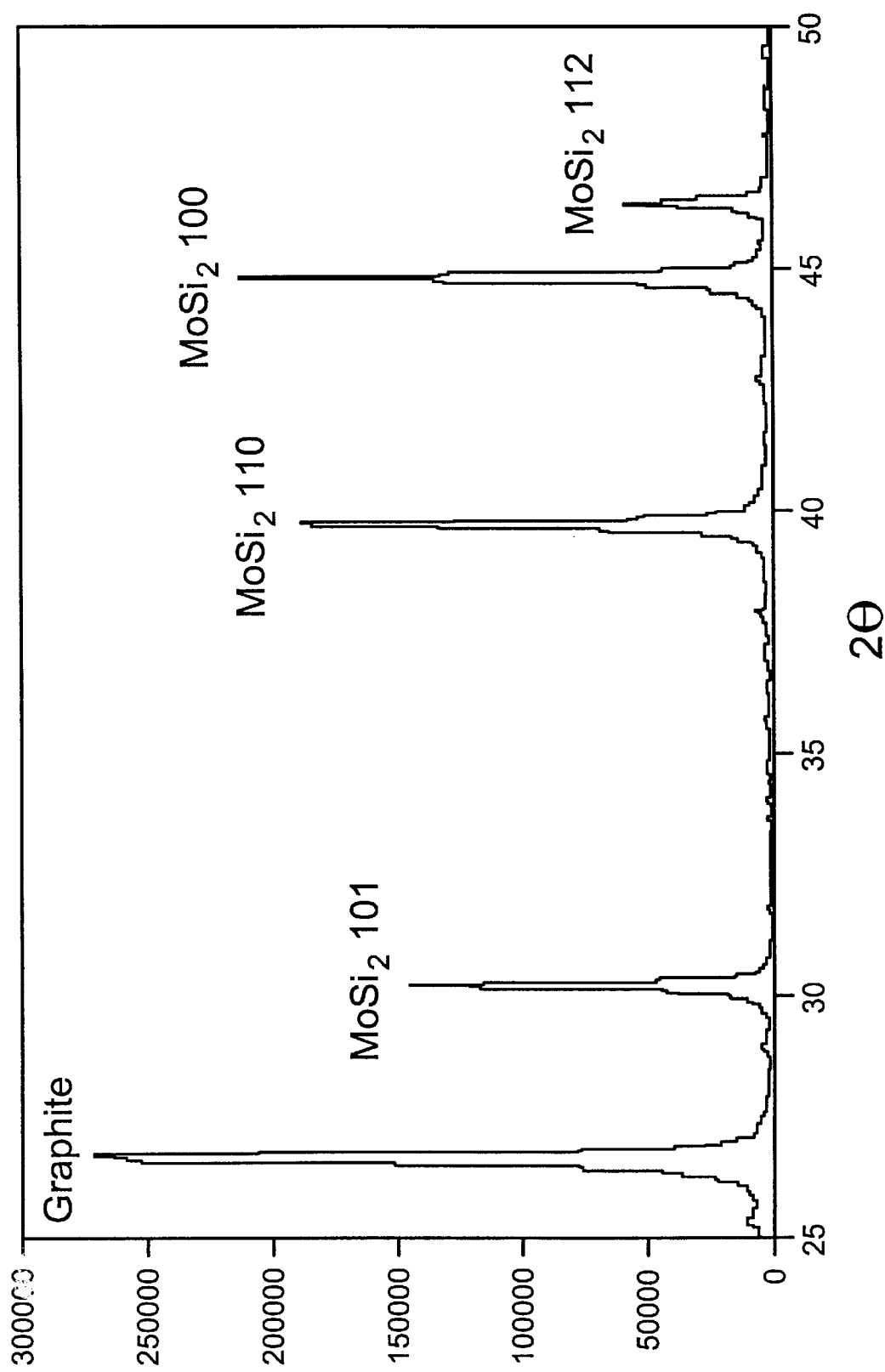
FIG. 2 is an x-ray diffraction pattern of a $MoSi_2$ product prepared according to the process of this invention.
Figure 3:
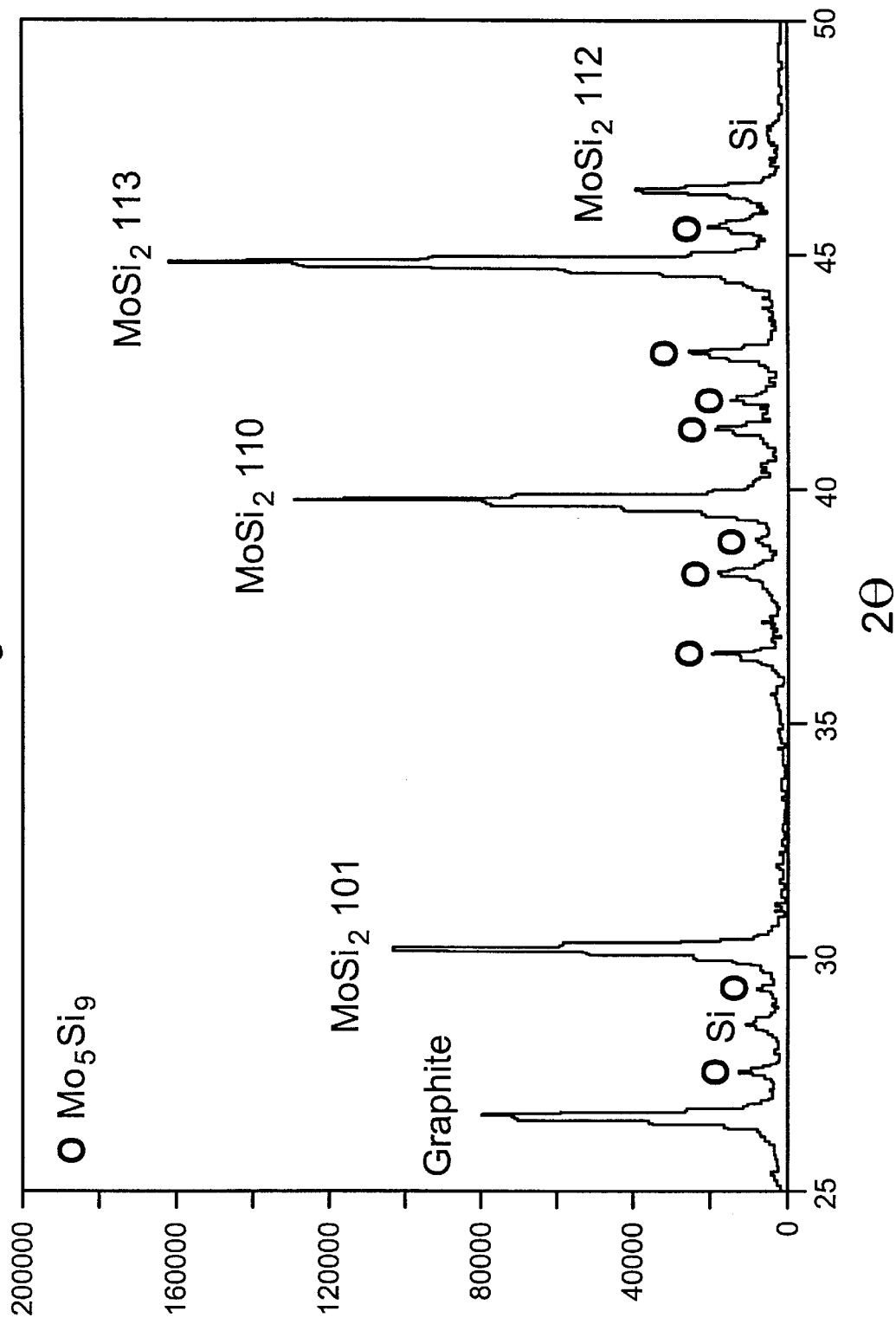
FIG. 3 is an x-ray diffraction pattern of a further $MoSi_2$ product prepared according to the process of this invention.

The products listed as Nos. 1 and 5 in Table V were analyzed by x-ray diffraction, and the resulting patterns are shown in FIGS. 2 and 3, respectively. Both patterns indicate that substantially all of the product was MoSi$_2$. Analysis of the diffraction pattern for product No. 1 indicated that the crystallites were equiaxial and the crystallite size was 62 nm with a negligible strain.

The foregoing is offered primarily for purposes of illustration. Those skilled in the art to which this invention pertains will recognize that further modifications, substitutions and other variations beyond what is described above can be made without departing from the spirit and scope of the invention.

What is claimed is:

1. A method for simultaneously synthesizing and densifying nanocrystalline materials, said method comprising:

(a) compacting nano-scale particles of said solid particular reactants into a green body in a preselected stoichiometric ratio; and (b) simultaneously (i) passing an electric current through said green body of sufficient intensity to cause Joule heating of said green body to a temperature at which synthesis of said reaction product from said solid particulate reactants is initiated and (ii) applying to said green body a pressure sufficiently high to cause said reaction product to have a relative density substantially greater than that of said green body.

2. A method in accordance with claim 1 further comprising forming said nano-scale particles by milling particles of sizes about 1 micron or greater in diameter.

3. A method in accordance with claim 1 in which said nano-scale particles are less than about 200 nm in diameter.

4. A method in accordance with claim 1 in which said nano-scale particles are from about 10 nm to about 200 nm in diameter.

5. A method in accordance with claim 1 in which said electric current is from about 1,000 Å to about 2,500 Å.

6. A method in accordance with claim 1 in which said electric current is from about 1,200 Å to about 1,800 Å.

7. A method in accordance with claim 1 in which said pressure is from about 30 MPa to about 300 MPa.

8. A method in accordance with claim 1 in which said pressure is from about 50 MPa to about 200 MPa.

9. A method in accordance with claim 1 in which said pressure is from about 70 MPa to about 110 MPa.

* * * * *